(12) United States Patent
Thampi

(10) Patent No.: US 12,556,535 B2
(45) Date of Patent: *Feb. 17, 2026

(54) AUTHENTICATION WITH OFFLINE DEVICE

(71) Applicant: Visa International Service Association, San Francisco, CA (US)

(72) Inventor: Wilson Thampi, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 315 days.

This patent is subject to a terminal disclaimer.

(21) Appl. No.: 18/184,347

(22) Filed: Mar. 15, 2023

(65) Prior Publication Data

US 2023/0216844 A1 Jul. 6, 2023

Related U.S. Application Data

(63) Continuation of application No. 16/246,383, filed on Jan. 11, 2019, now Pat. No. 11,637,825.

(51) Int. Cl.
*H04L 9/40* (2022.01)
*G06F 21/33* (2013.01)
(Continued)

(52) U.S. Cl.
CPC .......... *H04L 63/0853* (2013.01); *G06F 21/33* (2013.01); *H04L 9/3213* (2013.01);
(Continued)

(58) Field of Classification Search
CPC ............. H04L 63/0853; H04L 63/0884; H04L 9/3213; H04L 9/3271
See application file for complete search history.

(56) References Cited

U.S. PATENT DOCUMENTS 8,016,185 B2 * 9/2011 Modi ................. G06Q 20/0855
235/487
8,511,547 B2 8/2013 Rans et al.
(Continued)

FOREIGN PATENT DOCUMENTS

CN 204948095 U 1/2016
CN 105684009 A 6/2016
(Continued)

OTHER PUBLICATIONS

Application No. CN202010027125.9 , Office Action, Mailed on Oct. 20, 2023, 15 pages.
(Continued)

*Primary Examiner* — Eric W Shepperd
(74) *Attorney, Agent, or Firm* — Kilpatrick Townsend & Stockton LLP

(57) ABSTRACT

A first user device can transmit an interaction request to a remote computer via a long range communication channel. The first user device can receive an authentication request message from the remote computer and can then transmit the authentication request message to a second user device via a short range communication channel. The first user device can then receive an authentication response message comprising a response value from the second user device via the short range communication channel. The first user device can then transmit the authentication response message to the remote computer causing the remote computer to verify the response value and perform further processing if the response value is verified.

22 Claims, 4 Drawing Sheets

(51) Int. Cl.
*H04L 9/32* (2006.01)
*H04W 4/80* (2018.01)
*H04W 12/06* (2021.01)

(52) U.S. Cl.
CPC .......... *H04L 9/3215* (2013.01); *H04L 9/3271* (2013.01); *H04L 63/0884* (2013.01); *H04L 63/105* (2013.01); *H04W 4/80* (2018.02); *H04W 12/06* (2013.01); *H04L 2209/80* (2013.01)

(56) References Cited

U.S. PATENT DOCUMENTS

| | | | |
|---|---|---|---|
| 8,775,810 B1* | 7/2014 | Snodgrass | H04L 9/08 713/175 |
| 8,844,007 B2* | 9/2014 | Vicente | G16H 40/67 713/168 |
| 9,119,069 B1 | 8/2015 | Vipond et al. | |
| 9,191,381 B1* | 11/2015 | Popp | H04L 63/0823 |
| 9,372,971 B2 | 6/2016 | Hammad | |
| 9,906,493 B1* | 2/2018 | Rodgers | H04L 61/5007 |
| 10,089,801 B1 | 10/2018 | Musabeyoglu et al. | |
| 10,091,190 B2* | 10/2018 | Camenisch | G06F 21/604 |
| 10,122,719 B1 | 11/2018 | Mtavsky et al. | |
| 2005/0114896 A1* | 5/2005 | Hug | H04N 21/44204 725/90 |
| 2007/0005955 A1* | 1/2007 | Pyle | H04L 9/3228 713/156 |
| 2007/0245148 A1* | 10/2007 | Buer | H04L 63/08 713/183 |
| 2009/0204457 A1 | 8/2009 | Buhrmann et al. | |
| 2009/0204815 A1 | 8/2009 | Dennis et al. | |
| 2009/0254975 A1* | 10/2009 | Turnbull | H04W 4/029 709/205 |
| 2011/0197266 A1 | 8/2011 | Chu et al. | |
| 2012/0144498 A1 | 6/2012 | Buhrmann et al. | |
| 2013/0197998 A1 | 8/2013 | Buhrmann et al. | |
| 2014/0040155 A1 | 2/2014 | Buhrmann et al. | |
| 2014/0187205 A1 | 7/2014 | Dankar et al. | |
| 2015/0195133 A1 | 7/2015 | Sheets et al. | |
| 2015/0222435 A1* | 8/2015 | Lea | H04L 63/0823 713/155 |
| 2015/0281227 A1 | 10/2015 | Fox Ivey et al. | |
| 2016/0086176 A1 | 3/2016 | Silva Pinto et al. | |
| 2016/0148597 A1 | 5/2016 | Hamid et al. | |
| 2016/0180072 A1* | 6/2016 | Ligatti | G06F 21/40 726/7 |
| 2016/0197727 A1 | 7/2016 | Narendra et al. | |
| 2016/0197909 A1 | 7/2016 | Innes | |
| 2016/0227405 A1 | 8/2016 | Dennis et al. | |
| 2016/0242032 A1* | 8/2016 | De Kievit | H04W 12/06 |
| 2016/0247144 A1 | 8/2016 | Oh et al. | |
| 2016/0253652 A1 | 9/2016 | Je et al. | |
| 2016/0253669 A1 | 9/2016 | Yoon et al. | |
| 2017/0180384 A1* | 6/2017 | Malenfant | H04L 63/12 |
| 2017/0280323 A1 | 9/2017 | Dennis et al. | |
| 2017/0337554 A1 | 11/2017 | Mokhasi et al. | |
| 2017/0339151 A1 | 11/2017 | Van Os et al. | |
| 2018/0063128 A1 | 3/2018 | Korus et al. | |
| 2018/0068312 A1 | 3/2018 | Kim et al. | |
| 2018/0075231 A1 | 3/2018 | Subramanian et al. | |
| 2018/0077144 A1 | 3/2018 | Gangawane et al. | |
| 2018/0183778 A1* | 6/2018 | Bettenburg | G06F 21/57 |
| 2018/0352266 A1 | 12/2018 | Ericson et al. | |
| 2018/0352433 A1* | 12/2018 | Vendelbo | H04L 63/0492 |
| 2019/0012439 A1* | 1/2019 | Munro | G06Q 30/02 |
| 2020/0008060 A1 | 1/2020 | Dennis et al. | |
| 2020/0092285 A1 | 3/2020 | Graham et al. | |
| 2020/0252745 A1* | 8/2020 | Bellenger | H04W 48/04 |
| 2021/0006396 A1 | 1/2021 | Chen et al. | |

FOREIGN PATENT DOCUMENTS

| | | |
|---|---|---|
| CN | 107491966 A | 12/2017 |
| WO | 2015163771 A1 | 10/2015 |

OTHER PUBLICATIONS

Application No. CN202010027125.9, Notice of Decision to Grant, Mailed on May 22, 2024, 4 pages.
"Trusted Transactions Solution Data-Intelligence Advanced Authentication", HID Global Corporation/ASSA Abloy Abhid, Sep. 12, 2018, 5 pages.
"Web Authentication: An API for accessing Public Key Credentials Level 1", W3C Candidate Recommendation, Aug. 7, 2018, 90 pages.
U.S. Appl. No. 16/246,383, Advisory Action, Mailed on Nov. 10, 2022, 4 pages.
U.S. Appl. No. 16/246,383, Advisory Action, Mailed on Sep. 10, 2021, 5 pages.
U.S. Appl. No. 16/246,383, Final Office Action, Mailed on Jun. 30, 2021, 22 pages.
U.S. Appl. No. 16/246,383, Final Office Action, Mailed on Aug. 31, 2022, 25 pages.
U.S. Appl. No. 16/246,383, Non-Final Office Action, Mailed on Mar. 2, 2021, 15 pages.
U.S. Appl. No. 16/246,383, Non-Final Office Action, Mailed on Mar. 1, 2022, 24 pages.
U.S. Appl. No. 16/246,383, Notice of Allowance, Mailed on Jan. 18, 2023, 10 pages.
Application No. EP20151095.5, Extended European Search Report, Mailed on Mar. 27, 2020, 9 pages.

* cited by examiner

AUTHENTICATION WITH OFFLINE DEVICE

CROSS-REFERENCE TO RELATED APPLICATIONS

This application is a Continuation of U.S. patent application Ser. No. 16/246,383, filed on Jan. 11, 2019, the disclosure of which is herein incorporated by reference in its entirety for all purposes.

BACKGROUND

Two factor authentication (2FA) is a method of confirming a user's claimed identity in which a user is granted access after successfully presenting at least two pieces of evidence (i.e., factors) to an authentication computer. For example, a user can attempt to access a secure resource such as a secure webpage, such as an email account, using a first device such as a laptop computer. The user may need to supply two factors of authentication in order to access the secure webpage. A first factor can be the user's password that is input into the secure webpage. A second factor can be a one-time password (OTP) sent by the system or authentication computer to a second device operated by the user, such as the user's mobile phone. The user can enter the OTP into the webpage for authentication. The user can be granted access to the email account if both factors, the password and the OTP, are valid.

However, the user may attempt to access a secure webpage, secure data, secure location, perform an interaction, etc. while their second device that needs to receive the second factor is offline or does not have long range communication capabilities. In this case, two factor authentication may not be possible for the user, and the user will be unable to access the secure webpage.

Embodiments of the invention address this problem and other problems individually and collectively.

SUMMARY

Embodiments of the invention are related to methods and systems for two factor authentication.

One embodiment is directed to a method comprising: transmitting, by a first user device, an interaction request to a remote computer via a long range communication channel; receiving, by the first user device, an authentication request message from the remote computer; transmitting, by the first user device, the authentication request message to a second user device via a short range communication channel; receiving, by the first user device, an authentication response message comprising a response value from the second user device via the short range communication channel; and transmitting, by the first user device, the authentication response message to the remote computer causing the remote computer to verify the response value and perform further processing if the response value is verified.

Another embodiment is directed to a first user device comprising: a processor; a memory device; and a computer-readable medium coupled to the processor, the computer-readable medium comprising code executable by the processor for implementing a method comprising: transmitting an interaction request to a remote computer via a long range communication channel; receiving an authentication request message from the remote computer; transmitting the authentication request message to a second user device via a short range communication channel; receiving an authentication response message comprising a response value from the second user device via the short range communication channel; and transmitting the authentication response message to the remote computer causing the remote computer to verify the response value and perform further processing if the response value is verified.

One embodiment is directed to a method comprising: receiving, by a second user device, an authentication request message from a first user device via a short range communication channel; generating, by the second user device, a response value based on the authentication request message and a second user device identifier; and transmitting, by the second user device, an authentication response message comprising the response value to the first user device, wherein the first user device transmits the authentication response message to a remote computer causing the remote computer to verify the response value and perform further processing if the response value is verified.

Another embodiment is directed to a second user device comprising: a processor; a memory device; and a computer-readable medium coupled to the processor, the computer-readable medium comprising code executable by the processor for implementing a method comprising: receiving an authentication request message from a first user device via a short range communication channel; generating a response value based on the authentication request message and a second user device identifier; and transmitting an authentication response message comprising the response value to the first user device, wherein the first user device transmits the authentication response message to a remote computer causing the remote computer to verify the response value and perform further processing if the response value is verified.

One embodiment is directed to a method comprising: receiving, by a remote computer, an interaction request from a first user device via a long range communication channel; generating, by the remote computer, a token; transmitting, by the remote computer, an authentication request message comprising the token to the first user device, wherein the first user device transmits the authentication request message to a second user device via a short range communication channel; receiving, by the remote computer, an authentication response message from the first user device, the authentication response message comprising a response value generated by the second user device based on the token; verifying, by the remote computer, the response value; and performing, by the remote computer, further processing based on the verification.

Another embodiment is directed to a remote computer comprising: a processor; a memory device; and a computer-readable medium coupled to the processor, the computer-readable medium comprising code executable by the processor for implementing a method comprising: receiving an interaction request from a first user device via a long range communication channel; generating a token; transmitting an authentication request message comprising the token to the first user device, wherein the first user device transmits the authentication request message to a second user device via a short range communication channel; receiving an authentication response message from the first user device, the authentication response message comprising a response value generated by the second user device based on the token; verifying the response value; and performing further processing based on the verification.

Further details regarding embodiments of the invention can be found in the Detailed Description and the Figures.

DETAILED DESCRIPTION

Figure 1:
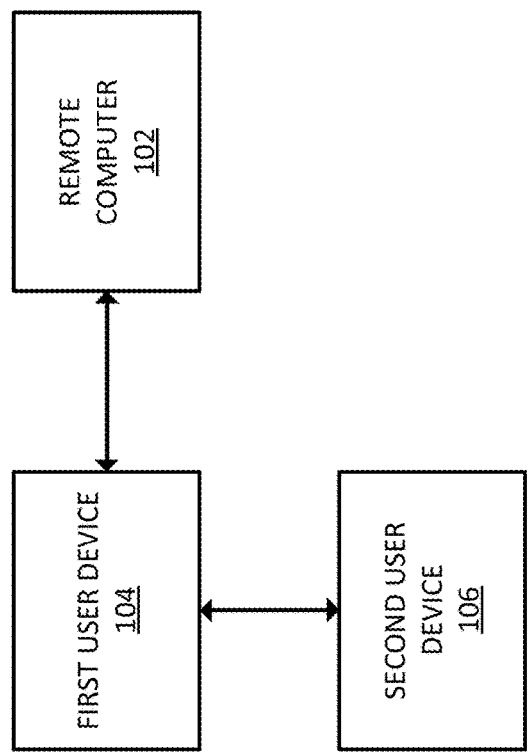
FIG. 1 shows a block diagram of a system illustrating a two factor authentication system according to embodiments of the invention.

Prior to discussing embodiments of the invention, some terms can be described in further detail.

A "user" can be a person that uses something (e.g., a computer, user device, etc.) for a particular purpose. In some embodiments, a user may include an individual that may be associated with one or more personal accounts and/or user devices. The user may also be a cardholder, an account holder, or a consumer in some embodiments.

A "user device" may be a device that is operated by a user. Examples of user devices may include a mobile phone, a smart phone, a card, a personal digital assistant (PDA), a laptop computer, a desktop computer, a server computer, a vehicle such as an automobile, a thin-client device, a tablet, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., third generation (3G), fourth generation (4G), or similar networks), Wi-Fi, Wi-Max, or any other communication medium that may provide access to a network such as the Internet or a private network. In some cases, a user device may not have long range communication capabilities.

A "long range communication channel" can include one or more paths of communication that can occur when two devices are remote from each other. Examples of long range communication channels include Wi-Fi communication channels, short message service (SMS) communication channels, Metropolitan Area Network (MAN) communication channels; Operating Missions as Nodes on the Internet (OMNI) communication channels; secured custom connection communication channels; Wide Area Network (WAN) communication channels; wireless network (e.g., employing protocols such as, but not limited to a Wireless Application Protocol (WAP), I-mode, and/or the like) communication channels; and/or the like. Long range communication channels can typically allow two devices to communicate with each other when then are more than about 50 meters apart, or even 1, 50, or 100 kilometers apart.

A "short range communication channel" can include one or more paths of communication that can occur when two devices are proximate to each other. Examples of short range communication channels include Bluetooth communication channels, Bluetooth low energy (BLE) communication channels, near-field communication (NFC) channels, radio-frequency identification (RFID) communication channels, Wi-Fi communication channels and/or the like. Short range communication channels can typically allow two devices to communicate with each other when then are less than about 50 meters apart.

A "peer device" can include a user device operated by a peer. A peer can be a second user, that interacts with a first user. In some embodiments, a peer device can communicate with external devices via long range communication channels and/or short range communication channels.

"Credentials" may comprise any evidence of authority, rights, or entitlement to privileges. For example, access credentials may comprise permissions to access certain tangible or intangible assets, such as a building or a file. Examples of credentials may include passwords, passcodes, or secret messages. In another example, payment credentials may include any suitable information associated with and/or identifying an account (e.g., a payment account and/or payment device associated with the account). Such information may be directly related to the account or may be derived from information related to the account. Examples of account information may include an "account identifier" such as a PAN (primary account number or "account number"), a token, a subtoken, a gift card number or code, a prepaid card number or code, a user name, an expiration date, a CVV (card verification value), a dCVV (dynamic card verification value), a CVV2 (card verification value 2), a CVC3 (card verification code 3), etc. An example of a PAN is a 16-digit number, such as "4147 0900 0000 1234". In some embodiments, credentials may be considered sensitive information.

A "token" may be a value that can be used in processing data. In some embodiments, a token is a value generated by a remote computer that is used in an authentication process. In some cases, a token can be a substitute value for a real credential. A token may be a string of numbers, letters, or any other suitable characters.

The term "verification" and its derivatives may include a process that utilizes information to determine whether an underlying subject is valid under a given set of circumstances. Verification may include any comparison of information to ensure some data or information is correct, valid, accurate, legitimate, and/or in good standing.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment.

A "response value" can include a value created in response to a request. A response value can include any suitable alphanumeric value (e.g., "AT92P1.") In some embodiments, the response value can include numeric values (e.g., "9381211.") In some embodiments, a response value can be an output of a hash function given a suitable input, such as a token and/or a device identifier. In some embodiments, a response value can be used as a factor in a two factor authentication process.

An "authorization request message" may be an electronic message that requests authorization for an interaction. In some embodiments, it is sent to a processing network computer and/or an issuer of a payment card to request authorization for a transaction. An authorization request message according to some embodiments may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction value, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a processing network computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the processing network computer) to the merchant's access device (e.g., POS equipment) that indicates approval of the transaction. The code may serve as proof of authorization.

An "authorizing entity" may be an entity that authorizes a request. Examples of an authorizing entity may be an issuer, a governmental agency, a document repository, an access administrator, etc. An authorizing entity may operate an authorizing entity computer. An "issuer" may refer to a business entity (e.g., a bank) that issues and optionally maintains an account for a user. An issuer may also issue payment credentials stored on a user device, such as a cellular telephone, smart card, tablet, or laptop to the consumer, or in some embodiments, a portable device.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may include a device that processes something. In some embodiments, a processor can include any suitable data computation device or devices. A processor may comprise one or more microprocessors working together to accomplish a desired function. The processor may include a central processing unit (CPU) comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

Details of some embodiments of the present invention will now be described. A user can be authenticated with two factors, for example, a password and a response value. The response value can be uniquely determined by a second user device as described in further detail herein. However, the second user device may not have long range communication capabilities that allow the second user device to receive one-time passwords or other authentication factors directly from an authentication computer over a long range communication channel as in conventional methods. These and other technical problems will be discussed herein.

FIG. 1 shows a system 100 according to an embodiment of the invention. The system 100 comprises a remote computer 102, a first user device 104, and a second user device 106. The remote computer 102 can be in operative communication with the first user device 104. The remote computer 102 and the first user device 104 can communicate via a long range communication channel. The first user device 104 can be in operative communication with the second user device 106. The first user device 104 and the second user device 106 can communicate via a short range communication channel.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

Messages between at least the first user device 104 and the remote computer 102 in FIG. 1 can be transmitted using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network that may reside between the first user device 104 and the remote computer 102 may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The remote computer 102 can be a server computer. The remote computer 102 can be capable of communicating via one or more long range communication channels. The remote computer 102 can allow a user to access secure data, interaction data, perform an interaction, etc. after authenticating the user. The remote computer 102 can authenticate the user using two factors (e.g., a password and a response value). In some embodiments, the remote computer 102 can be an authentication computer and perform authentication functions.

The first user device 104 can be a user device capable of communicating via long range communication channels as well as short range communication channels. In some embodiments, the first user device 104 can communicate with another device using a short range communication channel such as a Bluetooth or Wi-Fi communication channel. The first user device 104 can also communicate with an external device using a long range communication channel (e.g., one that may utilize the Internet or a cellular phone network). In some embodiments, the first user device 104 can generate and transmit interaction request messages to the remote computer 102 via one or more long range communication channels.

The second user device 106 can be a user device capable of communicating via the short range communication channel. The second user device 106 can be said to be "offline" as it cannot communicate via the long range communication channel. The inability to communicate via the long range communication channel may be temporary or permanent. With respect to the latter, a second user device 106 may be manufactured such that it does not have long range communication hardware or software and thus cannot communicate via long range communication channels. With respect to the former, a second user device 106 may have the hardware and/or software that can allow it to communicate via a long range communication channel, but it may be temporarily disabled by the user or the second user device 106 may be incapable of communicating with a remotely located external device due to environmental factors (e.g., the second user device 106 may be present in a building where cellular reception is weak).

In some embodiments, the second user device 106 can receive authentication request messages from the first user device 104 via a short range communication channel such as Bluetooth or Wi-Fi. The second user device 106 can then determine a response value based on the authentication request message. The second user device 106 can also transmit the response value to the first user device 104, where the first user device 104 can display the response value to the user. The user can input the response value into the first user device 104 to be transmitted to the remote computer 102 via the long range communication channel. The remote computer 102 may then authenticate the user using the response value.

Figure 2:
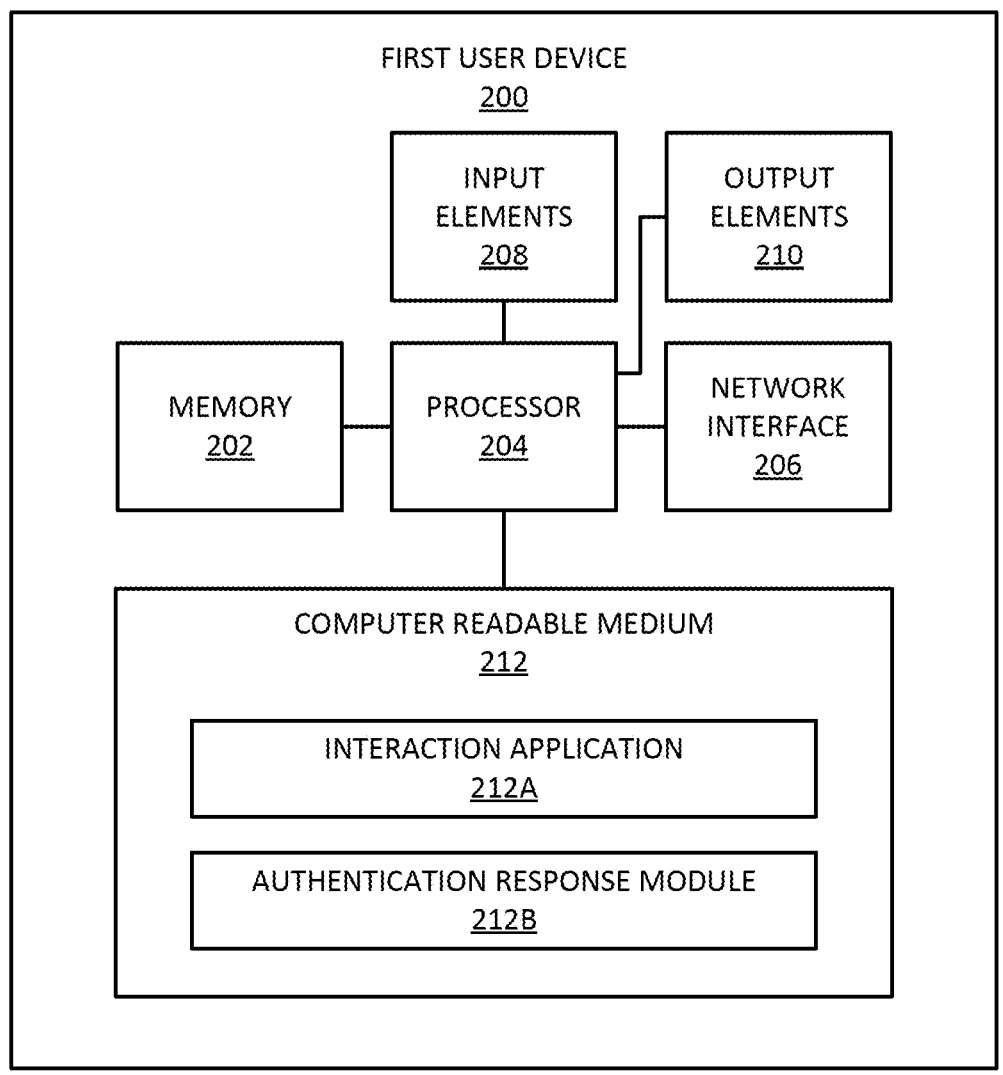
FIG. 2 shows a block diagram illustrating a first user device according to an embodiment of the invention.

FIG. 2 shows a block diagram of a first user device 200 according to some embodiments of the invention. The exemplary first user device 200 may comprise a processor 204. The processor 204 may be coupled to a memory 202, a network interface 206, input elements 208, output elements 210, and a computer readable medium 212. The computer readable medium 212 can comprise an interaction application 212A and an authentication response module 212B.

The memory 202 can be used to store data and code. The memory 202 may be coupled to the processor 204 internally or externally (e.g., cloud based data storage), and may comprise any combination of volatile and/or non-volatile memory, such as random access memory (RAM), dynamic random access memory (DRAM), read-only memory (ROM), flash, or any other suitable memory device.

The network interface 206 may include an interface that can allow the first user device 200 to communicate with external computers. Network interface 206 may enable the first user device 200 to communicate data to and from another device (e.g., resource provider computer, authorizing entity computer, etc.). Some examples of network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by network interface 206 may include Wi-Fi™. Data transferred via network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium. The network interface 206 can utilize a long range communication channel as well as a short range communication channel.

The one or more input elements 208 may include any suitable device(s) capable of inputting data into the first user device 200. Examples of input elements 208 include buttons, touchscreens, touch pads, microphones, etc.

The one or more output elements 210 may comprise any suitable device(s) that may output data. Examples of output elements 210 may include display screens, speakers, and data transmission devices. For example, the output elements 210 can include a display screen capable of displaying a response value to a user of the first user device 200.

The computer readable medium 212 may comprise code, executable by the processor, for performing a method comprising: transmitting, by a first user device, an interaction request to a remote computer via a long range communication channel; receiving, by the first user device, an authentication request message from the remote computer; transmitting, by the first user device, the authentication request message to a second user device via a short range communication channel; receiving, by the first user device, an authentication response message comprising a response value from the second user device via the short range communication channel; and transmitting, by the first user device, the authentication response message to the remote computer causing the remote computer to verify the response value and perform further processing if the response value is verified.

The interaction application 212A can include an application stored on the first user device 200. The interaction application 212A can, in conjunction with the processor 204, accept input from a user via the one or more input elements 208. The interaction application 212A can, in conjunction with the processor 204, allow the user to initiate an interaction. For example, the user can initiate an interaction such as a data transfer between the first user device 200 and an external peer device. The interaction application 212A can, in conjunction with the processor 204, receive interaction data such as username(s), amount(s), device identifiers, an indication of what to transfer, a recipient of the transfer, and/or the like. The interaction application 212A can, in conjunction with the processor 204, generate an interaction request comprising the interaction data. The interaction application 212A can then, in conjunction with the processor 204, transmit the interaction request to the remote computer. In some embodiments, later, the interaction application 212A can, in conjunction with the processor 204, receive a response value as input from the user.

In some embodiments, the interaction application 212A can, in conjunction with the processor 204, receive credentials from the user. For example, the credentials can include a password. The interaction application 212A can, in conjunction with the processor 204, include the credentials in the interaction request.

The authentication response module 212B, in conjunction with the processor 204, can receive authentication response messages comprising response values from a second user device via the short range communication channel. The authentication response module 212B can, in conjunction with the processor 204, also display the response value to the user via the one or more output elements 210, such as a display screen.

Figure 3:
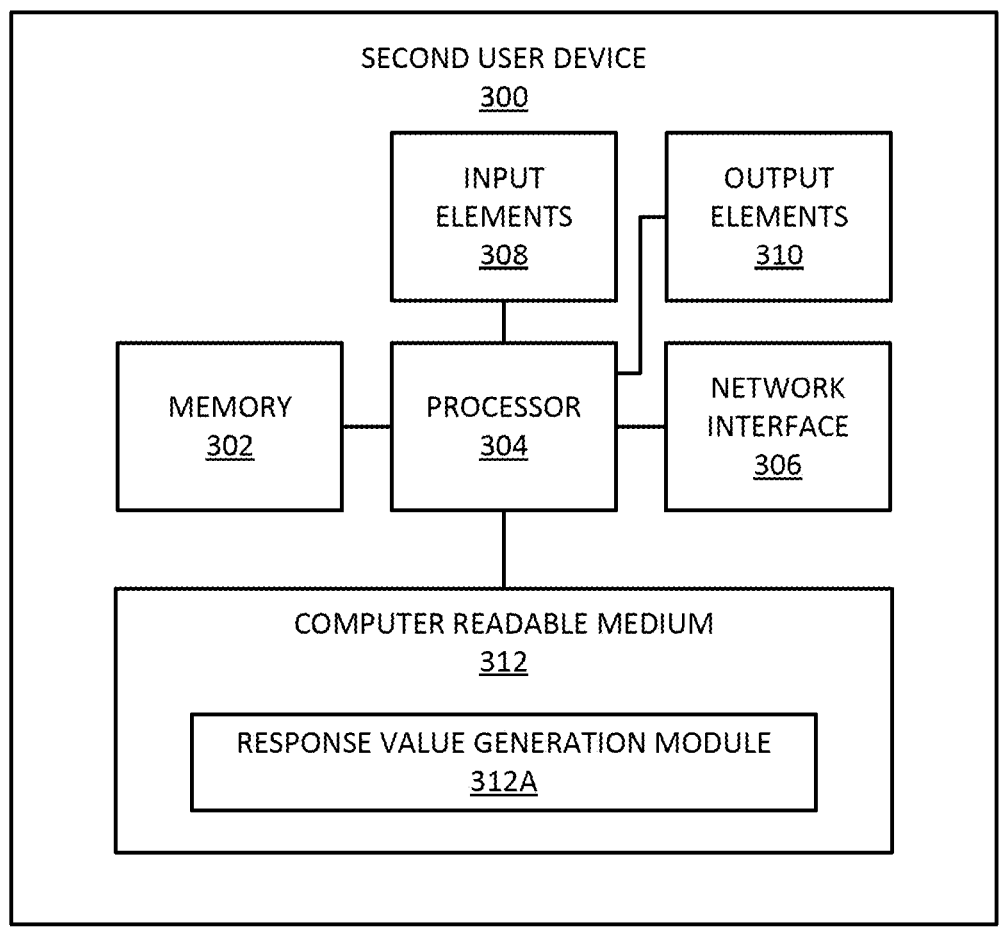
FIG. 3 shows a block diagram illustrating a second user device according to an embodiment of the invention.

FIG. 3 shows a block diagram of a second user device 300 according to some embodiments of the invention. The exemplary second user device 300 may comprise a processor 304. The processor 304 may be coupled to a memory 302, a network interface 306, input elements 308, output elements 310, and a computer readable medium 312. The computer readable medium 312 can comprise a response value generation module 312A.

The memory 302 can be similar to the memory 202, the network interface 306 can be similar to the network interface 206, the input elements 308 can be similar to the input elements 208, and the output elements 310 can be similar to the output elements 210, and will be repeated here. However, in this embodiment, the network interface 306 can communicate via a short range communication channel, but not via a long range communication channel.

The response value generation module 312A, in conjunction with the processor 304, can generate response values, after receiving requests for response values. The response value generation module 312A, in conjunction with the processor 304, can receive an authentication request message comprising a token. In some embodiments, the inputs to the response value generation module 312A can include the token and a device identifier of the second user device 300 (i.e., a second user device identifier). In some embodiments, the response value generation module 312A, in conjunction with the processor 304, can create the response value by hashing or otherwise altering the token and the second user device identifier. The response value generation module 312A, in conjunction with the processor 304, can hash the token and the second user device identifier with any suitable hash function. The hash function can be a keyed cryptographic hash function such as hash message authentication code (HMAC), message-digest algorithm 6 (MD6), etc. or an unkeyed cryptographic hash function such as secure hash algorithm (SHA)-256, SHA-512, etc. In other embodiments, the response value can be created by encrypting input data with a secret symmetric key that is held by the remote computer and a corresponding second user device.

The response value generation module 312A, in conjunction with the processor 304, can generate response values, after receiving requests for response values. The response value generation module 312A, in conjunction with the processor 304, can receive an authentication request message comprising a token. In some embodiments, the inputs to the response value generation module 312A can include the token and a device identifier of the second user device 300 (i.e., a second user device identifier). In some embodiments, the response value generation module 312A, in conjunction with the processor 304, can create the response value by hashing or otherwise altering the token and the second user device identifier. The response value generation module 312A, in conjunction with the processor 304, can hash the token and the second user device identifier with any suitable hash function. The hash function can be a keyed cryptographic hash function such as hash message authentication code (HMAC), message-digest algorithm 6 (MD6), etc. or an unkeyed cryptographic hash function such as SHA-256, SHA-512, etc. In other embodiments, the response value can be created by encrypting input data with a secret symmetric key that is held by the remote computer and a corresponding second user device.

In some embodiments, the response value generation module 312A can concatenate the token and the device identifier with any other suitable information, such as a user identifier. The response value generation module 312A can then input the concatenated data into the hash function (or other type of cryptographic function) to generate the response value. It can be desirable to use information associated with a user (e.g., an account identifier or token) and information associated with the second user device 300 (e.g., a second user device identifier) as inputs to creating the response value. By doing so, the response value can embed different types of authentication factors to ensure greater security.

The response value generation module 312A can, in conjunction with the processor 304, output the response value. Upon generating the response value, the second user device 300 can transmit the response value to the first user device via the short range communication channel.

In some embodiments, the remote computer can also include a computer readable-medium comprising at least a response value generation module. The response value generation module of the remote computer can be similar to the response value generation module 312A of the second user device 300. The hash function (or other cryptographic function) stored by the remote computer can be the same hash function as stored by the second user device 300. In this way, the remote computer and the second user device 300 can input the same inputs (i.e., the token and the device identifier of the second user device 300) into the respective hash functions which can both output the same value (i.e., response value). Thus, when the remote computer receives the response value from the second user device 300 via the first user device, the remote computer can compare the received response value to an expected response value. The hash function can allow for the remote computer to verify that some input data maps to a given hash value.

Figure 4:
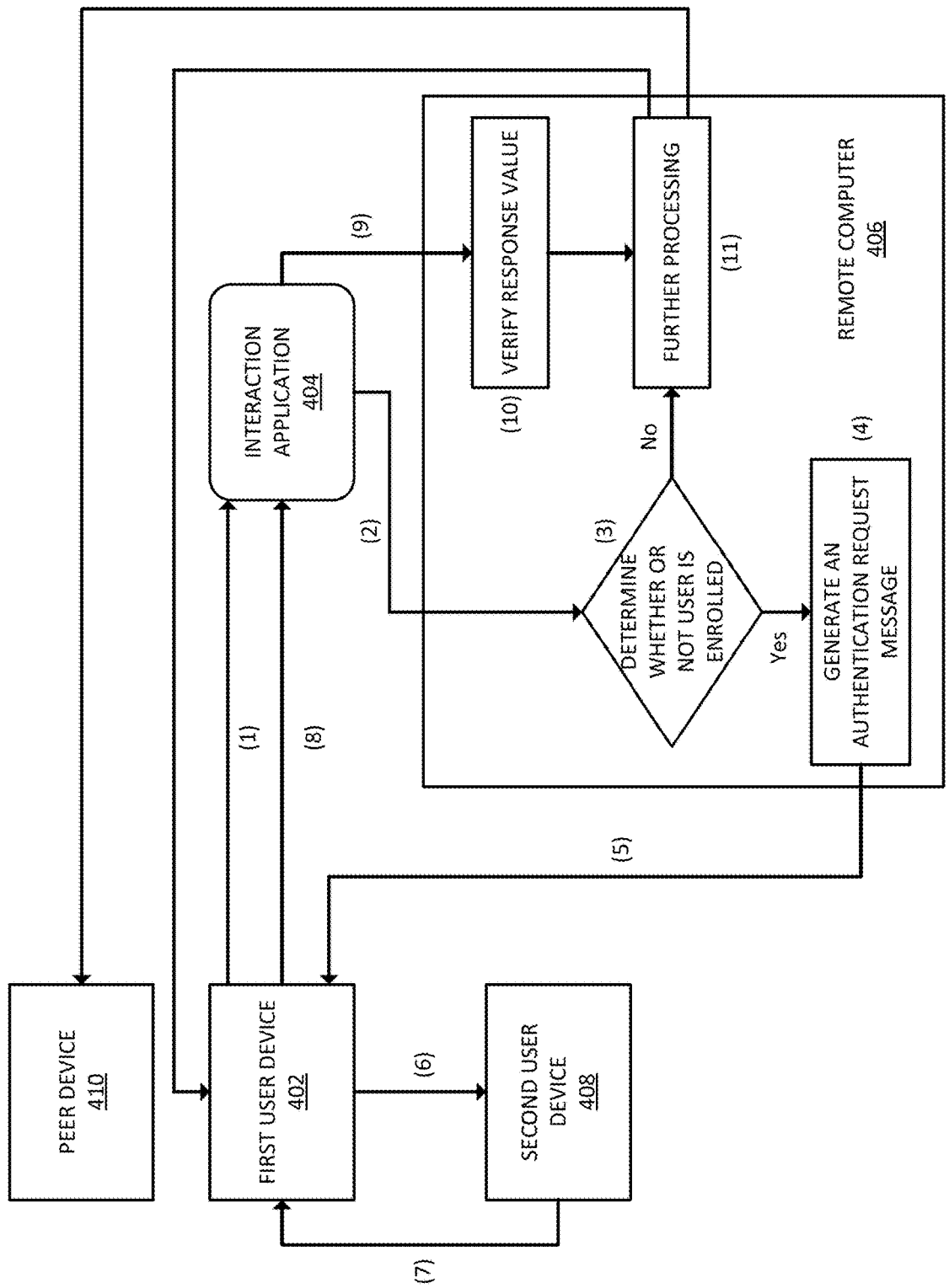
FIG. 4 shows a flow diagram illustrating a two factor authentication process according to an embodiment of the invention.

FIG. 4 shows a flowchart illustrating a two factor authentication process according to an embodiment of the invention. The method illustrated in FIG. 4 will be described in the context of a user initiating a data transfer using an interaction application. It is understood, however, that the invention can be applied to other circumstances (e.g., initiate an interaction, such as a transaction, request access to a location, such as a building, etc.) where the user can be authenticated. Although the steps are illustrated in a specific order, it is understood that embodiments of the invention may include methods that have the steps in different orders. In addition, steps may be omitted or added and may still be within embodiments of the invention.

FIG. 4 includes a first user device 402, an interaction application 404, a remote computer 406, a second user device 408, and a peer device 410. In some embodiments, the first user device 402 can include the interaction application 404.

Prior to step 1, a user of the first user device 402 and the second user device 408 can enroll in a two factor authentication program. Both the first user device 402 and the second user device 408 can be operated by the same user. For example, the first user device 402 can be a mobile phone operated by the user and the second user device can be a smart watch, which does not independently have remote communication capabilities. The user can create credentials such as a password as well as create a username, and provide those credentials to the remote computer 406. The user can also enroll a second user device, such as the second user device 408. During the enrollment of the second user device 408, a device identifier of the second user device 408 can be transmitted to the remote computer 406. For example, the user can input the device identifier of the second user device 408 into the first user device 402 or another communication device. The first user device 402 or the another communication device can transmit the credentials and/or the device identifier of the second user device 408 to the remote computer 406 in an enrollment request message.

At step 1, the user can initiate an interaction, such as a peer data transfer, with the peer device 410 using the first user device 402. In one example, the peer data transfer may be a transfer of money from one user of the first user device 402 to another user of the peer device 410. The user of the first user device 402 can input interaction data into the first user device 402. The interaction data can include username(s), amounts, an indication of what to transfer, a recipient of the transfer, and/or data associated with an interaction. In some embodiments, the user can also provide credentials, such as a password, to the interaction application 404. For example, the user can login to the interaction application 404 using a username and a password. The password can be a first factor in the authentication process.

At step 2, the interaction application 404 on the first user device 402 can generate an interaction request. The interaction request can include the interaction data and, in some embodiments, the credentials. The first user device 402 can transmit the interaction request to the remote computer 406 via a long range communication channel, as described herein. For example, the first user device 402 can transmit the interaction request via a cellular network connection or a Wi-Fi and Internet connection to the remote computer 406.

At step 3, after receiving the interaction request, the remote computer 406 can determine whether or not the user is enrolled in a two factor authentication program. For example, the remote computer 406 can compare credentials including a user identifier (e.g., a username) and password received in the interaction request to user identifiers in a user database. In some embodiments, the remote computer 406 can compare the credentials received in the interaction request to stored credentials (i.e., credentials stored during enrollment). The remote computer 406 can determine whether or not the received credentials match the stored credentials. The stored credentials can be stored in any suitable manner. For example, the stored credentials can be encrypted (e.g., via message digest algorithm 5 (MD5), MD6, SHA-256, etc.) prior to being stored. Upon receiving credentials from the first user device 402, the remote computer 406 can encrypt the received credentials and compare the encrypted received credentials to the encrypted stored credentials. In yet other embodiments, the stored credentials can be salted prior to being hashed with a hash function. For example, a salt, which can be a random value, can be concatenated with the credentials before inputting the credentials into the hash function. The salt can be a static salt or a dynamic salt generated by a random string generator, as known to one of ordinary skill in the art. The salt value can be used to prevent replay attacks.

If the remote computer 406 determines that the user is enrolled in the authentication program, then the remote computer 406 can proceed to step 4. If the remote computer 406 determines that the user is not enrolled in the authentication program, then the remote computer 406 can proceed to step 11.

At step 4, after determining that the user is enrolled in the authentication program, the remote computer 406 can generate a token. The token can be any suitable alphanumeric characters. The remote computer 406 can generate the token based on a user identifier and/or a device identifier. In some embodiments, the token can be generated using information unique to the user, such as a username, user account number (e.g., any suitable value, a PAN, etc.), and/or the like. In yet other embodiments, the token may be a random value such as a one-time password, which exists independently of any type of user credential.

The token can be an identifier for the user that can be a substitute for user information such as an account number. For example, the remote computer 406 can encrypt a user identifier as well as a user device identifier (i.e., the first user device identifier and/or the second user device identifier) with a cryptographic key using any suitable cryptographic protocol such as HMAC, SHA-256, etc. The remote computer 406 can then generate an authentication request message comprising the token.

In some embodiments, the remote computer 406 can contact another external server computer (not shown) to generate the token on behalf of the remote computer 406. The remote computer 406 can then receive the token from the server computer.

At step 5, the remote computer 406 can transmit the authentication request message to the first user device 402. The remote computer 406 can transmit the authentication request message to the first user device 402 via the long range communication channel.

At step 6, after receiving the authentication request message from the remote computer 406, the first user device 402 can transmit the authentication request message to the second user device via a short range communication channel, as described herein. For example, the short range communication channel can be a Bluetooth or Wi-Fi communication channel.

In some embodiments, the first user device 402 can determine whether or not the second user device 408 is in communication range via the short range communication channel, prior to transmitting the authentication request message to the second user device 408. If the first user device 402 determines that the second user device 408 is not in communication range, then the first user device 402 can notify the user, via a display or other suitable output element, to bring the first user device 402 into short range communication with the second user device 408. In other embodiments, the first user device 402, after waiting a predetermined length of time, can transmit an authentication response message that indicates that authentication failed to the remote computer 406. For example, the authentication response message can include a code that can indicate, to the remote computer 406, that the second user device 408 could not be contacted. The code can be any suitable alphanumeric string, such as "901," "707A," etc.

At step 7, after receiving the authentication request message, the second user device 408 can determine a response value based on the authentication request message and a second user device identifier. For example, the second user device 408 can determine the response value based on the token included in the authentication request message. The second user device 408 can utilize a hash function (or other cryptographic function) that can accept the token and the second user device identifier as inputs, as described herein. The hash function can output a data value of fixed size, this data value can be the response value.

For example, the token can be a value of 0123456789, while the second user device identifier can be a value of 123ABC. The second user device 408 can determine the response value using a hash function of, for example, SHA-256. The response value can then be a 256 bit alphanumeric value (i.e., 32 bytes which is usually represented as a hexadecimal number of 64 digits, for example, ef6204f95e580471c2bf651f35d368616a61a7e577e36f7c40 c896d176656e12).

In other embodiments, the second user device 408 can encrypt the token and the second user device with a symmetric key of a key pair held by the second user device 408 and the remote computer 406.

The second user device 408 can create an authentication response message comprising the response value. The second user device 408 can then transmit the authentication response message to the first user device 402. The second user device 408 can transmit the authentication response message to the first user device 402 via the short range communication channel.

In some embodiments, the second user device 408 can truncate the response value to include approximately one to ten alphanumeric characters. In this way, the response value can be of a length that is manageable by the user in step 8 below. In other embodiments, a hash function that outputs a response value of approximately one to ten alphanumeric characters can be utilized by the second user device 408.

At step 8, after receiving the authentication response message from the second user device 408 via the short range communication channel, the first user device 402 can display the response value to the user of the first and second user devices 402, 408. The user can then input the response value into the interaction application 404. For example, the user can copy the response value from the display into a data field in the interaction application 404. The user can type, or otherwise input, the response value into the interaction application 404.

For example, if the response value is equal to '89AF2,' then the first user device 402 can display '89AF2' to the user via a pop-up notification on the display of the second user device 408. The user can then input the response value '89AF2' into a data field provided by the interaction application. The user can select the data field and may type, or otherwise input, '89AF2' into the data field.

At step 9, after receiving the response value, the interaction application 404 can transmit the response value to the remote computer 406 via the long range communication channel. In some embodiments, the first user device 402 can include the response value in an authentication response message prior to transmitting the response value to the remote computer 406.

At step 10, after receiving the response value from the first user device 402, the remote computer 406 can verify the response value. The remote computer 406 can compare the received response value to an expected response value. The expected response value can be a value that the remote computer 406 expects to receive based on the token. For example, the remote computer 406 can determine the expected response value using a hash function. The inputs to the hash function can include the token (sent to the first user device at step 5) and the second user device identifier (received prior to step 1 during enrollment). For example, the token can be a value of 0123456789, while the second user device identifier can be a value of 123ABC as described above. The remote computer 406 can determine the response value using a hash function of SHA-256. The response value can then be ef6204f95e580471c2bf651f35d368616a61a7e577e36f7c40 c896d176656e12, which is the same as the response value determined by the second user device 408.

In some embodiments, the response value may be truncated to a portion of the full output of the hash function, as described herein. In other embodiments the hash function can output approximately on to ten alphanumeric characters.

The received response value can match the expected response value when the inputs to the hash function by the second user device 408 and the remote computer 406 are the same. In other words, if the second user device 408 inputs the token and the second user device identifier while the remote computer 406 inputs the token and the second user device identifier, then the outputs (i.e., the received response value and the expected response value) are the same, thus allowing the user to be authenticated.

In other embodiments, if symmetric key encryption is used, then the response value may be created by encrypting the second device identifier and the token using a symmetric key shared with the second user device. In still other embodiments, the response value can be decrypted with the symmetric key to obtain the inputs to the response value, and those inputs can be verified to authenticate the user.

At step 11, after verifying the response value, the remote computer 406 can perform further processing. Further processing can depend upon whether or not the response value was determined to be valid.

If the remote computer 406 determined that the response value is not valid, then further processing can include notifying the first user device 402 that the response value was not valid. For example, the remote computer 406 can transmit a message to the first user device 402 that states "response value incorrect," or any other suitable message.

If the remote computer 406 determined that the response value is valid, then further processing can include performing an interaction using the interaction data. In some embodiments, the remote computer 406 can transmit an interaction notification to the peer device 410. For example, the interaction notification can be a data transfer notification. The interaction notification can include data related to the interaction, such as the interaction data. In some embodiments, the user of the peer device 410 (i.e., a peer) can confirm or deny the interaction. If the interaction is confirmed, then the remote computer 406 can perform the interaction. For example, the remote computer 406 can push data, as indicated in the transfer data, to the peer device 410. In some embodiments, the remote computer 406 can store the data to be transferred in a database and can retrieve the data from the database when the interaction is authenticated and confirmed. The remote computer 406 can transmit the data to the peer device 410. In other embodiments, the remote computer can contact a server computer that has stored the data, and request the data to be made available to the peer device 410.

Further processing can also include transferring data between the first user device 402 and the peer device 410, allowing the user to access secure location(s), data, webpage(s), etc., performing a peer-to-peer transfer, such as a peer-to-peer payment transfer, and the like.

In another example, the user can attempt to access a secure area using an access application (i.e., an interaction application) on a first user device, such as a mobile phone. The user can input access data into the access application, such as a building access code, or a request to access the building. The interaction application can transmit an interaction request, which can comprise the access data, to a remote computer. In this example, the remote computer can be a building access computer located in the building or other location. Upon receiving the interaction request, the remote computer can determine whether or not the user is enrolled in a building access program. For example, the remote computer can store a list of usernames, names, device identifiers, and/or any other user information that corresponds with users that are eligible to access the building.

The remote computer can then generate an authentication request message and transmit the authentication request message to the first user device via the long range communication channel. The first user device can forward the authentication request to the second user device, which can be a smartwatch, via the short range communication channel. The second user device can generate a response value based on a token included in the authentication request message and a second user device identifier. After generating the response value, the second user device can transmit the response value to the first user device via the short range communication channel. The first user device can display the response value to the user, for example on a display screen. The access application can receive the response value from the user and can then transmit an authentication response message to the remote computer via the long range communication channel.

The remote computer can then determine if the received response value matches an expected response value, as described herein. If the remote computer verifies the response value, then the remote computer can perform further processing such as allowing the user to access the building. For example, the remote computer can transmit a signal to an access device that indicates the access device to unlock a door to the building.

As yet another example of further processing, the remote computer can, upon successful authentication, seek authorization from an authorizing entity computer. Upon successful authorization, the authorizing entity computer can credit a recipient's (e.g., the user of the peer device) local bank account or card. A money transfer service can be used for both cross-border and domestic transactions to effect person-to-person money transfer(s) in a variety of situations. In one specific embodiment, the money transfer service can utilize the "Verified by Visa" authentication service (available from Visa International Service Association, Foster City, Calif.) and Visa's Account Funding Transaction ("AFT"). In other embodiments, Visa's Original Credit Transaction ("OCT") can also be used to deliver funds to a recipient (formerly known as a "CFT"-Cardholder Funds Transfer). Next, further processing of an AFT and then an OCT will be described. Additionally, AFT and OCT are further described in U.S. Pat. No. 8,016,185, which is incorporated herein for all purposes.

The system, described herein, can further comprise a processing network computer, an authorizing entity computer of a sender, and an authorizing entity computer of a recipient. The processing network computer may be configured to provide authorization services, and clearing and settlement services for payment transactions. A processing network computer may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services. Furthermore, the payment processing network may include a server computer and may use any suitable wired or wireless telecommunications network, including the Internet.

The authorizing entity computer may be operated by an account issuer of the sender (i.e., user of the first and second user devices). Typically the issuer is an entity (e.g., a bank) that issues and maintains an account of the sender. The account may be a credit, debit, prepaid, or any other type of account. In some embodiments, the sender and the recipient can be associated with the same or different authorizing entities.

During an AFT, after authentication, the remote computer can transmit an authorization request to the authorizing entity computer (i.e., the sender's issuer) via a suitable network computer, such as VisaNet. The authorization request can be a standard authorization message that can include information resulting from authentication, such as interaction data, described above. In this embodiment, the authorization request can use an AFT authorization request message. The AFT can include a transaction designed to supply funds to another account such as a Visa prepaid, debit, ATM card or on-line account, and is explained in more detail below. In some embodiments, the AFT can include paying the remote computer for sending funds to another party. The AFT can result in a debit to the sender's payment card account. Assuming that funds are available from the sender (or that credit is available), the authorizing entity computer can approve the transaction.

After the authorizing entity computer authorizes the interaction, the authorizing entity computer can generate an authorization response message which can be transmitted to the remote computer via the processing network computer. The remote computer can then transmit the authorization response message, or derivative thereof, to the interaction application on the first user device. The interaction application can confirm to the sender, via an on-screen message on the first user device, that both authentication and authorization have been successful and that the money transfer will occur. Alternatively, or in addition, the interaction application may also send an e-mail confirmation message to the sender. At this point, the sender may choose to log off of (or simply exit or leave) the interaction application. Once both authentication and authorization have been successful and the remote computer has been so apprised, the remote computer may deliver funds to the recipient and may itself be guaranteed payment of those funds. Because of this guarantee, the interaction application is able to confirm to the sender that payment will be made.

In some embodiments, the sender can confirm to the recipient that the funds will be delivered via any suitable means such as letter, telephone, short messaging service (SMS), electronic mail, instant messaging, etc. The remote computer can alert the recipient using any of these methods.

After any suitable period of time, such as at the end of a day, a clearing and settlement process can be performed. Within a set period of time the processing network computer can clear and settle the transaction and move funds from the sender's issuer to a service provider bank (i.e., the remote computer bank). The service provider bank can deliver the transferred funds to the recipient. As mentioned above, once the interaction is authenticated and authorized, the service provider bank can make the funds available to the recipient in their bank account in real time, that is, on the order of seconds, by performing a real-time posting of funds to the recipient.

In yet other embodiments, further processing can include performing an original credit transaction (OCT). In some embodiments, the recipient of the interaction can be associated with an authorizing entity (i.e., an issuer), which can be referred to as the recipient's issuer. The recipient's issuer (useful in this embodiment where the destination account is an existing payment card) can be the bank or financial institution that has issued the payment card to the recipient. The recipient's issuer can credit the recipient's payment card account upon receipt of the appropriate transaction from a service provider computer, as described above.

In this embodiment, the recipient's destination account can be an existing payment card account, and delivery of funds can be achieved by a credit to the existing card account. The payment card may include a credit card, debit card, prepaid card, or other suitable payment card. An OCT message can be used to submit an original credit through the processing network computer to the recipient's issuer.

When the sender (i.e., the user of the first and second user device) inputs interaction data into the interaction application (e.g., at step 1 of FIG. 4) the sender can choose to transfer funds to a recipient's payment card, and can supply payment card details such as the type of card, account number, cardholder name, expiry date, issuing bank, and/or any other relevant information depending upon the type of card. The service provider computer can submit an OCT transaction via the network computer to the recipient's issuer. The result of the OCT transaction can be an instruction to the recipient's issuer to credit the payment card account of the recipient; this step can be typically performed at the end of the business day.

Use of the OCT transaction generally assumes that the service provider computer and the recipient's issuer bank are different banks. In that situation, the OCT transaction can provide a convenient mechanism for money transfer. If the service provider bank and the recipient's issuer bank are the same bank, it is possible for that bank to simply perform an internal "on-us" credit posting to credit funds to the recipient's payment card. Nevertheless, it is entirely possible that when the service provider bank and the recipient's issuer bank are the same bank, that the bank will choose to execute an OCT transaction rather than use their internal systems. This situation can occur if it is more difficult for the bank to connect internal systems than it is to execute an OCT transaction.

The recipient's issuer can then credit the recipient's payment card account with the amount of the transferred funds. In this embodiment, the time lag from the submission of the OCT transaction by the service provider bank to the actual credit of the recipient's card account is approximately two business days (48 hours).

In some embodiments, clearing and settlement can occur between the service provider computer and the recipient's issuer, i.e., the OCT leg of the transaction. Clearing and settling can occur within two business days. The sender's issuer can bill the sender for the remittance transaction (including any service fees and fees for foreign currency conversion). This billing step can include a standard transaction known the in art.

Embodiments of the invention provided for a number of advantages. For example, the user can utilize two user devices while performing two factor authentication, however, the second user device is not required to be connected to a remote computer in order to receive token(s). Embodiments of the invention allow two factor authentication with a device that is offline.

Embodiments of the invention provide for a number of additional advantages. For example, the user is authenticated with the first and second factors (i.e., a password and a response value) as well as due to the second user device being in short range communication with the first user device. Since the second user device is in short range communication with the first user device during authentication, security is improved since the user will most likely be in possession of both the first user device and the second user device. The short range communication channel makes it more difficult for a malicious party to attempt to falsely impersonate a legitimate user, as the malicious party would need to steal both the first and second user devices and keep them in short range communication to impersonate the legitimate user.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
   receiving, by a remote computer, a second identifier from a second user device;
   receiving, by the remote computer, an interaction request from a first user device via a first communication channel;
   generating, by the remote computer, in response to receiving the interaction request from the first user device, a token that is a hash of at least the second identifier associated with the second user device that is different than a first identifier associated with the first user device;
   transmitting, by the remote computer, an authentication request message comprising the token to the first user device, wherein the first user device transmits the authentication request message to the second user device via a second communication channel;
   receiving, by the remote computer, an authentication response message from the first user device, the authentication response message comprising a response value generated by the second user device based on the token;
   verifying, by the remote computer, the response value; and
   performing, by the remote computer, further processing based on the verification.

2. The method of claim 1, wherein the second user device generates the response value based on the second identifier associated with the second user device.

3. The method of claim 1, wherein further processing includes transferring data between the first user device and a peer device, allowing a user of the first user device to access a secure location, data, and/or webpage, and/or performing a peer-to-peer transfer of value.

4. The method of claim 1, further comprising:
   determining, by the remote computer, an expected response value based on a stored second user device identifier and the token; and
   comparing, by the remote computer, the expected response value to the response value.

5. The method of claim 1, wherein the second user device generates the response value by:
   inputting the token included in the authentication request message and a second identifier associated with the second user device into a hash function; and
   obtaining the response value as an output of the hash function.

6. The method of claim 1, further comprising:
   verifying, by the remote computer, the response value with respect to an expected response value, the expected response value being generated by the remote computer based on an encryption key shared by the remote computer and the second user device.

7. The method of claim 1, wherein the first communication channel has a range that is longer than the second communication channel.

8. The method of claim 1, wherein the second user device does not have a direct communication channel established with the remote computer.

9. The method of claim 1, wherein the remote computer receives the second identifier of the second user device from the first user device.

10. The method of claim 1, further comprising:
    truncating, by the second user device, the response value to be transmitted to the first user device.

11. The method of claim 10, wherein a truncated response value includes 1 to 10 alphanumeric characters.

12. The method of claim 1, wherein the response value has a fixed size of 256 bits.

13. A computer system comprising:
    a processor;
    a memory device; and
    a computer-readable medium coupled to the processor, the computer-readable medium comprising code executable by the processor for implementing a method comprising:
      receiving, by a remote computer, a second identifier from a second user device;
      receiving an interaction request from a first user device via a first communication channel;
      generating, in response to receiving the interaction request from the first user device, a token that is a hash of at least the second identifier associated with the second user device that is different than a first identifier associated with the first user device;
      transmitting an authentication request message comprising the token to the first user device, wherein the first user device transmits the authentication request message to the second user device via a second communication channel;
      receiving an authentication response message from the first user device, the authentication response message comprising a response value generated by the second user device based on the token;
      verifying the response value; and
      performing further processing based on the verification.

14. The computer system of claim 13, wherein the remote computer generates the token based on a first identifier associated with a user of the second user device.

15. The computer system of claim 13, wherein the second user device generates the response value based on a second identifier associated with the second user device.

16. The computer system of claim 13, wherein further processing includes transferring data between the first user device and a peer device, allowing a user of the first user device to access a secure location, data, and/or webpage, and/or performing a peer-to-peer transfer of value.

17. The computer system of claim 13, wherein the remote computer determines an expected response value based on a stored second user device identifier and the token, wherein the computer compares the expected response value to the response value.

18. The computer system of claim 13, wherein the second user device generates the response value by:
    inputting the token included in the authentication request message and a second identifier associated with the second user device into a hash function; and
    obtaining the response value as an output of the hash function.

19. The computer system of claim 13, wherein the remote computer verifies the response value with respect to an expected response value, the expected response value being generated by the computer based on an encryption key shared by the computer and the second user device.

20. The computer system of claim 13, wherein the first communication channel has a range that is longer than the second communication channel.

21. The computer system of claim 13, wherein the token is a payment token.

22. The computer system of claim 13, wherein the second user device does not have a direct communication channel established with the computer.

* * * * *